United States Patent
Bienmueller et al.

(10) Patent No.: US 9,969,866 B2
(45) Date of Patent: May 15, 2018

(54) POLYAMIDE COMPOSITIONS

(71) Applicant: LANXESS Deutschland GmbH, Cologne (DE)

(72) Inventors: Matthias Bienmueller, Krefeld (DE); Jochen Endtner, Cologne (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days. days.

(21) Appl. No.: 14/926,136

(22) Filed: Oct. 29, 2015

(65) Prior Publication Data

US 2016/0122511 A1 May 5, 2016

(51) Int. Cl.
| | |
|---|---|
| *C08K 7/14* | (2006.01) |
| *C08K 3/36* | (2006.01) |
| *C08K 9/06* | (2006.01) |
| *C08L 77/02* | (2006.01) |
| *C08L 77/06* | (2006.01) |
| *C08K 5/3492* | (2006.01) |
| *B29C 45/00* | (2006.01) |
| *B29C 45/18* | (2006.01) |
| *B29C 47/00* | (2006.01) |
| *B29C 49/00* | (2006.01) |
| *B29C 49/04* | (2006.01) |
| *C08K 3/22* | (2006.01) |
| *C08K 5/20* | (2006.01) |
| *B29K 77/00* | (2006.01) |
| *B29K 105/12* | (2006.01) |
| *B29K 105/16* | (2006.01) |
| *B29K 309/08* | (2006.01) |
| *B29K 509/08* | (2006.01) |

(52) U.S. Cl.
CPC ............ *C08K 7/14* (2013.01); *B29C 45/0001* (2013.01); *B29C 45/18* (2013.01); *B29C 47/0004* (2013.01); *B29C 49/0005* (2013.01); *B29C 49/04* (2013.01); *C08K 3/22* (2013.01); *C08K 3/36* (2013.01); *C08K 5/20* (2013.01); *C08K 5/34924* (2013.01); *C08K 5/34928* (2013.01); *C08K 9/06* (2013.01); *C08L 77/02* (2013.01); *C08L 77/06* (2013.01); *B29K 2077/00* (2013.01); *B29K 2105/12* (2013.01); *B29K 2105/16* (2013.01); *B29K 2309/08* (2013.01); *B29K 2509/08* (2013.01); *B29K 2995/0016* (2013.01); *C08K 2003/2241* (2013.01)

(58) Field of Classification Search
CPC .... C08K 7/14; C08K 3/36; C08K 9/06; C08L 77/02; C08L 77/06; B29C 45/0001
See application file for complete search history.

(56) References Cited

U.S. PATENT DOCUMENTS

| | | | |
|---|---|---|---|
| 4,097,446 A | 6/1978 | Abolins et al. | |
| 4,314,927 A * | 2/1982 | Theysohn | C08K 3/02 524/100 |
| 8,349,941 B2 | 1/2013 | Stoppelmann | |
| 8,993,670 B2 | 3/2015 | Fujii et al. | |
| 2007/0072967 A1 * | 3/2007 | Nass | C08K 5/5313 524/100 |
| 2008/0161490 A1 | 7/2008 | Endtner et al. | |
| 2009/0306262 A1 | 12/2009 | Tsunoda et al. | |
| 2010/0249307 A1 | 9/2010 | Stoppelmann | |
| 2011/0034609 A1 | 2/2011 | Duijnhoven Van et al. | |
| 2012/0165439 A1 * | 6/2012 | Endtner | C08K 3/40 524/101 |
| 2013/0092226 A1 | 4/2013 | Pawlik et al. | |
| 2013/0296468 A1 | 11/2013 | Endtner et al. | |
| 2015/0274940 A1 | 10/2015 | Endtner | |
| 2015/0274941 A1 | 10/2015 | Endtner | |

FOREIGN PATENT DOCUMENTS

| | | | |
|---|---|---|---|
| CN | 103013104 A | 4/2013 | |
| DE | 4236122 A1 | 4/1994 | |
| DE | 202010017765 U1 | 12/2010 | |
| EP | 1990369 A1 | 2/2007 | |
| JP | 2005350662 A | 12/2005 | |
| JP | 2007070627 | 3/2007 | |
| JP | 2009221479 | 10/2009 | |
| JP | 201121204 A | 3/2011 | |
| JP | 2015213963 A | 5/2014 | |
| WO | WO-9422942 A1 * | 10/1994 | ........... C08K 3/0033 |
| WO | 12080403 A1 | 6/2012 | |

OTHER PUBLICATIONS

Lanxess Glass Fiber Data Sheet Chopped Strands CS 7928. Jul. 3, 2013.*
Acculam Epoxyglas, Material Safety Data Sheet, dated Nov. 29, 2007, 4 pages.
Shimadzu, Solutions for Science, Apr. 8, 2014, 7 pages.
LANXESS Deutschland GmbH HPM Business Unit, "Milled Fiber Glass Data Sheet", Jul. 3, 2013, 2 pages.
LANXESS Deutschland GmbH HPM Business Unit, Chopped Strands Glass Fiber Data Sheet, Jul. 3, 2013, 2 pages.
European Search Report from co-pending Application EP15188081 dated Dec. 14, 2015 4pages.

* cited by examiner

*Primary Examiner* — John E Uselding

(57) ABSTRACT

Polyamides, such as polyamide compositions based on nylon-6 (PA 6) or nylon-6,6 (PA 66) and including melamine cyanurate, natural quartz powder, and glass fibers have improved heat resistance, flame retardancy, and isotropic shrinkage characteristics.

17 Claims, No Drawings

POLYAMIDE COMPOSITIONS

The present invention relates to compositions based on nylon-6 (PA 6) or nylon-6,6 (PA 66) comprising melamine cyanurate, quartz powder and glass fibres.

BACKGROUND INFORMATION

To modify processing, working and use characteristics, most plastics are provided with auxiliaries and with fillers and reinforcers. The latter improve properties such as stiffness, strength, heat resistance, dimensional stability, and reduce the thermal expansion of products based on plastics.

Of particular significance for plastics compositions are fillers and reinforcers composed of minerals or glass, especially borosilicate glass or silicate glass, which is used in a wide variety of different forms, for example in the form of glass fibres, glass flakes or else in the form of expanded glass or foamed glass. Fillers and reinforcers have a significant influence on the heat resistance of plastics. For example, when fibrous fillers having a correspondingly high aspect ratio are used, very good heat resistances are achieved. However, the anisotropic geometry of a fibre in the course of processing leads to alignment of the fibres in flow direction and to associated anisotropic shrinkage during processing, which subsequently leads to unwanted warpage in the products. The "wick effect" associated with the fibres also leads to a deterioration in the self-extinguishment properties of these products, these being of significance, for example, in the glow wire test to IEC 60695-2-12 (GWFI). In order to be able to assure sufficient flame retardancy of plastics-based products with fibrous fillers too, for example glass fibres, it is generally necessary to use halogen- or phosphorus-based flame retardants. Halogen-based flame retardants are the subject of public discussion because they accumulate in the environment. It is desirable to avoid phosphorus-based flame retardants because of energy-intensive production. Moreover, in the case of phosphorus-containing flame retardants, there is the risk of corrosive deposits at electrical contacts when the product is an electrical component or electronic component.

When non-fibrous fillers are used, especially talc, clay minerals, mica, expanded glass or foamed glass, isotropic shrinkage is obtained in products, but these moulding compositions and the products that are produced therefrom then frequently have inadequate heat resistances (<130° C.) or inadequate self-extinguishment properties in the GWFI test at relatively low wall thicknesses (<1 mm).

EP 2468810 A1 Example 3 describes a polyamide-based composition comprising, as well as melamine cyanurate, ground glass and also ground chopped glass fibres. A disadvantage of this composition according to EP 2468810 A1 is its poor heat resistance and associated significantly restricted usability in electrical components, for example circuit breakers. An additional factor is that the ground glass types used in that case have to undergo a very energy-intensive operation to produce the glass.

CN 103 013 104 A describes flame-retardant nylon-6-based compositions based on halogen-free flame retardants, comprising melamine cyanurate and talc as inorganic filler.

But a good heat resistance with simultaneously isotropic shrinkage characteristics and good self-extinguishment properties in the GWFI test is an important prerequisite for the use of polyamide-based compositions in electronic components of complex structure, especially in residual current circuit breakers and other circuit breakers.

According to "http://de.wikipedia.org/wiki/Leitungsschutzschalter", a circuit breaker, also colloquially called cutout or fuse for short, is an excess current protection device in electrical installation and is used in low-voltage grids. A residual current circuit breaker provides protection from fault currents (see: http://de.wikipedia.org/wiki/Fehlerstromschutzschalter).

It was therefore an object of the present invention to provide polyamide-based compositions suitable for production of products for the electrical industry, these products being notable for high heat resistance with simultaneously low isotropic shrinkage characteristics, for good self-extinguishment properties in the glow wire test to IEC60695-2-12, even with low wall thicknesses around 0.8 mm, and at the same time being obtainable with a smaller proportion of energy-intensively produced raw materials compared to the prior art.

According to "http://de.wikipedia.org/wiki/W%C3%A4rmeformbest%C3%A4ndigkeit", heat resistance is a measure of the thermal durability of plastics. Because they have viscoelastic material characteristics, there is no strictly defined upper use temperature for plastics; Instead, a substitute parameter is determined under defined load. For this purpose, two standardized methods are available, the method of heat deflection temperature (HDT) and the Vicat softening temperature (VST).

The method of the heat deflection temperature described in DIN EN ISO 75-1, -2, -3 (precursor: DIN 53461) uses standard test specimens with rectangular cross section, which are subjected to three-point bending under constant load, preferably with their edges flat. According to the test specimen height, an edge fibre strain $\sigma_1$ of 1.80 (Method A), 0.45 (Method B) or 8.00 N/mm² (Method C) is achieved by using weights or/and springs to apply a force $$F = \frac{2\sigma_f bh^2}{3L}.$$

b: sample width
h: sample height
L: distance between rests.

Subsequently, the stressed samples are subjected to heating at a constant heating rate of 120 K/h (or 50 K/h). If the deflection of the sample reaches an edge fibre elongation of 0.2%, the corresponding temperature is the heat deflection temperature (or heat distortion temperature) HDT.

The Vicat softening temperature (VST) to DIN EN ISO 306 (precursor: DIN 53460) is measured with a needle (having a circular area of 1 mm²). A test force of 10 N (test force A) or 50 N (test force B) is applied thereto. The test specimen having a permissible thickness of 3 to 6.4 mm is subjected to a defined heating rate of 50 or 120 K/h. The VST has been attained when the penetrating body reaches a penetration depth of 1 mm. According to the standard, the test is only applicable to thermoplastics and gives an indication of the practical sustained use limit, which is about 15 K below the Vicat temperature. Variation of the boundary conditions gives four parameter combinations:

VST/A50
VST/A120
VST/B50 (preferred method for comparative tests (ISO 10350-1)
VST/B120.

According to "http://de.wikipedia.org/wiki/Schwindung#Schwindung_bei_Gie.C3.9Fharzen", shrinkage is the change in volume of a material or workpiece without removal of material or exertion of force. Shrinkage takes place through drying, cooling or chemical or physical transformation mechanisms in the material. Low shrinkage in casting resins based on thermoplastics is a quality criterion, since installed components can otherwise come under compressive stress, and gaps can form between these and other components to be wetted if adhesion is insufficient. In the case of injection-moulded products in electrical engineering/electronics, shrinkage can lead to ingress of moisture and to reduced stress resistance. Isotropic shrinkage is understood by the person skilled in the art to mean equal shrinkage in all spatial directions. The shrinkage characteristics are tested to DIN EN ISO 294-4, as is also the case in the context of the present invention.

The energy-intensive production of glass from a blend consisting of silicon oxide ($SiO_2$), sodium oxide ($Na_2O$) and calcium oxide, and optionally further additives, is elucidated in http://de.wikipedia.org/wiki/Glas. This blend has to be converted to a homogeneous glass melt, for example, in continuous furnaces at temperatures of about 1400° C. or more. The energy needed to melt the glass has to be provided by fossil fuels or electrical energy.

It has now surprisingly been found that, for compositions based on polyamides, such as, for example PA 6 or PA 66, when quartz powder obtained from naturally occurring quartz is used in the form described in detail below in combination with glass fibres, melamine cyanurate and optionally titanium dioxide, electrical or electronic articles produced from the compositions have excellent properties in relation to heat resistance, flame retardancy in the glow wire test to IEC60695-2-12 and isotropic shrinkage characteristics. This can be achieved without any need to subject the quartz powder obtained from naturally occurring quartz to an energy-intensive melting operation.

SUMMARY OF THE INVENTION

The invention thus provides compositions comprising
A) polyamides, preferably nylon-6 or nylon-6,6,
B) at least one quartz powder having a d95 in the range from 5 to 250 μm, preferably in the range from 10 to 150 μm, more preferably in the range from 15 to 90 μm, most preferably in the range from 16 to 55 μm,
C) chopped long glass fibres having a starting length in the range from 1 to 50 mm, more preferably in the range from 1 to 10 mm, most preferably in the range from 2 to 7 mm, and
D) melamine cyanurate.

For clarity, it should be noted that the scope of the present invention encompasses all the definitions and parameters mentioned hereinafter in general terms or specified within areas of preference, in any desired combinations, wherein specified ranges are intended to cover ranges from end-point to end-point, as well as from an end-point to any value in the range, or from any value within the range to any other value within the range.

DESCRIPTION OF THE INVENTION

The Invention preferably provides compositions comprising
A) 5% to 96.9% by weight, preferably 20% to 90% by weight, more preferably 30% to 80% by weight, of nylon-6 or nylon-6,6,
B) 1% to 60% by weight, preferably 5% to 50% by weight, more preferably 10% to 40% by weight, of at least one quartz powder having a d95 of 5 to 250 μm, preferably 10 to 150 μm, more preferably 15 μm to 90 μm, and most preferably 16 to 55 μm,
C) 2% to 8% by weight, preferably 3% to 7% by weight, more preferably 4% to 6% by weight, of chopped long glass fibres having a starting length of 1 to 50 mm, more preferably 1 to 10 mm, most preferably 2 to 7 mm, and
D) 0.1% to 40% by weight, preferably 1% to 20% by weight, of melamine cyanurate,
with the proviso that the sum total of all the percentages by weight is always 100.

The inventive compositions are formulated for further utilization by mixing the components A) to D) for use as reactants in at least one mixing apparatus. This gives, as intermediates, moulding compositions based on the inventive compositions. These moulding compositions may either consist exclusively of components A) to D), or else contain further components in addition to components A) to D), preferably at least one of the components E) to L) as defined below. In this case, components A) to D) should be varied within the scope of the ranges specified such that the sum total of all the percentages by weight is always 100.

In one embodiment, the compositions comprise, in addition to components A), B), C) and D), also E) titanium dioxide, preferably in an amount of 0.01% to 30% by weight, more preferably in an amount of 1% to 25% by weight, even more preferably in an amount of 5% to 20% by weight, based in each case on the overall composition, in which case the levels of the other components are reduced to such an extent that the sum total of all the percentages by weight is always 100.

In one embodiment, the compositions comprise, in addition to components A) to E) or instead of E), also F) at least one lubricant and/or demoulding agent, preferably in an amount of 0.01% to 5% by weight, more preferably in an amount of 0.05% to 3% by weight, especially preferably in an amount of 0.1% to 2% by weight, based in each case on the overall composition, in which case the levels of the other components are reduced to such an extent that the sum total of all the percentages by weight is always 100.

In one embodiment, the compositions comprise, in addition to components A) to F) or instead of E) and/or F), also G) at least one laser absorber, preferably in an amount of 0.01% to 10% by weight, more preferably in an amount of 0.1% to 5% by weight, even more preferably in an amount of 0.5% to 3.5% by weight, based in each case on the overall composition, selected from the group of antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone, in which case the levels of the other components are reduced to such an extent that the sum total of all the percentages by weight is always 100.

In one embodiment, the compositions comprise, in addition to components A) to G) or instead of E) and/or F) and/or G), also H) at least one further flame retardant other than melamine cyanurate (=component D)), preferably in an amount of 0.01% to 60% by weight, more preferably in an amount of 1% to 30% by weight, even more preferably in an amount of 5% to 25% by weight, especially preferably in an amount of 0.01% to 60% by weight, based in each case on the overall composition, in which case the levels of the other components are reduced to such an extent that the sum total of all the percentages by weight is always 100. Preference is given in accordance with the invention to using halogen-free and/or phosphorus-free flame retardants.

In one embodiment, the compositions comprise, in addition to components A) to H) or instead of E) and/or F) and/or G) and/or H), also K) at least one filler other than components 8) and C), preferably in an amount of 0.01% to 50% by weight, more preferably in an amount of 1% to 30% by weight, even more preferably in an amount of 2% to 15% by weight, very especially preferably in an amount of 2% to 6% by weight, based in each case on the overall composition, in which case the levels of the other components are reduced to such an extent that the sum total of all the percentages by weight is always 100.

In one embodiment, the compositions comprise, in addition to components A) to K) or instead of components E) and/or F) and/or G) and/or H) and/or K), also L) at least one further additive other than components D) to K), preferably in an amount of 0.01% to 20% by weight, more preferably in an amount of 0.05% to 10% by weight, most preferably in an amount of 0.1% to 5% by weight, based in each case on the overall composition, in which case the levels of the other components are reduced to such an extent that the sum total of all the percentages by weight is always 100.

Component A)

As component A), the composition may include polyamides or copolyamides. Polyamides PA 6 [CAS No. 25038-54-4] or PA 66 [CAS No. 32131-17-2], or copolyamides based on PA 6 and/or PA 66 are encompassed by the subject-matter of the present invention.

The nomenclature of the polyamides used in the context of the present application corresponds to the international standard, the first number(s) indicating the number of carbon atoms in the starting diamine and the last number(s) the number of carbon atoms in the dicarboxylic acid. If only one number is stated, as in the case of PA6, this means that the starting material was an α,ω-aminocarboxylic acid or the lactam derived therefrom, i.e. ℈-caprolactam in the case of PA6; for further information, reference is made to H. Domininghaus, Die Kunststoffe und ihre Eigenschaften [The Polymers and Their Properties], pages 272 ff., VDI-Verlag, 1976.

Preferably, the nylon-6 or the nylon-6,6 for use as component A) may have a viscosity number determined in a 0.5% by weight solution in 96% by weight sulphuric acid at 25° C. to ISO 307 of about 80 to about 180 ml/g.

More preferably, the nylon-6 for use as component A), by the standard specified and by the method specified above, may have a viscosity number of about 85 to about 160 ml/g, most preferably a viscosity number of about 90 to about 140 ml/g.

The nylon-6,6 for use as component A), by the method specified above, more preferably may have a viscosity number of about 110 to about 170 ml/g, most preferably a viscosity number of about 130 to about 160 ml/g.

In accordance with Hans Domininghaus in "Die Kunststoffe und ihre Eigenschaften", 5th edition (1998), p. 14, thermoplastic polyamides are understood to mean polyamides wherein the molecule chains do not have any side branches or else have side branches which are of greater or lesser length and differ in terms of number, and which soften when heated and are formable to a virtually unlimited degree.

The polyamides preferred in accordance with the invention can be prepared by various processes and synthesized from very different units and, in the specific application case, can be modified alone or in combination with processing auxiliaries, stabilizers or else polymeric alloy partners, preferably elastomers, to give materials having specific combinations of properties. Also suitable are blends having proportions of different polymers, preferably of polyethylene, polypropylene, ABS, in which case it is optionally possible to use one or more compatibilizers. The properties of the polyamides can be improved through addition of elastomers, for example in terms of impact resistance. The multitude of possible combinations enables a very large number of products having a wide variety of different properties.

A multitude of procedures for preparation of polyamides have become known, with use, depending on the desired end product, of different monomer units, different chain transfer agents to establish a desired molecular weight, or else monomers with reactive groups for aftertreatments intended at a later stage.

The processes of industrial relevance for preparation of the polyamides usually proceed via polycondensation in the melt. In the context of the present invention, the hydrolytic polymerization of lactams is also regarded as polycondensation.

The PA 6 and PA 66 for use as component A) may be semicrystalline polyamides. Semicrystalline polyamides have, according to DE 10 2011 084 519 A1, an enthalpy of fusion of about 4 to about 25 J/g, measured by the DSC method to ISO 11357 in the 2nd heating operation and integration of the melt peak. In contrast, amorphous polyamides have an enthalpy of fusion of less than about 4 J/g, measured by the DSC method to ISO 11357 in the 2nd heating operation and integration of the melt peak.

Polyamides or copolyamides for use with preference as component A) in accordance with the invention may include those which are prepared proceeding from diamines and dicarboxylic acids and/or lactams having at least 5 ring members or corresponding amino acids. Useful reactants preferably include aliphatic dicarboxylic acids, more preferably adipic acid, aliphatic diamines, more preferably hexamethylenediamine, aminocarboxylic acids, especially aminocaproic acid, or the corresponding lactams. Copolyamides of a plurality of the monomers mentioned are included.

As examples, the nylon-6 for use with preference as component A) may be obtained from ε-caprolactam, and the nylon-6,6 for use with preference as component A) may be obtained from hexamethylenediamine and adipic acid.

Especially preferably, nylon-6 may be used as the polyamide.

Preference is further given to most of the compounds based on PA 6, PA 66 or copolyamides thereof, in which there are 3 to 11 methylene groups, very especially preferably 4-6 methylene groups, for each polyamide group in the polymer chain.

Component B)

As component B), the compositions comprise ground quartz having a particle size distribution having a d95 of about 5 to about 250 μm, preferably about 10 to about 150 μm, more preferably about 15 to about 90 μm, and most preferably about 16 to 55 μm. Preference is given here to using quartz flour additionally having a d50 of about 2 to about 50 μm, preferably about 3 to about 40 μm, more preferably about 5 to about 30 μm, and most preferably about 8 to about 25 μm. According to the invention, the particle size may preferably be determined by means of laser diffractometry in accordance with standard ISO 13320, while other reliable methods may also be used.

With regard to the d50 and d95 values, the determination thereof and the meaning thereof, reference is made to Chemie Ingenieur Technik (72) p. 273-276, 3/2000, Wiley-VCH Verlags GmbH, Weinheim, 2000, according to which the d50 is that particle size with 50% of the amount of particles below it (median) and the d95 is that particle size with 95% of the amount of particles below it.

The figures for particle size distribution and the particle sizes relate here to what are called surface area-based particle sizes, in each case prior to incorporation into the thermoplastic moulding composition. The particle size may be determined by means of laser diffractometry; see C. M. Keck, Moderne Pharmazeutische Technologie [Modern Pharmaceutical Technology]2009, Frele Universität Berlin, chapter 3.1. or QUANTACHROME PARTIKELWELT NO 6, June 2007, pages 1 to 16.

Preferably, the quartz used may be of particulate, non-cylindrical form and may have a length to thickness ratio of less than 5, preferably less than 3, and more preferably less than 2. The value of zero is of course impossible.

According to the invention, the ground quartz for use may be obtained by milling from naturally occurring crystalline quartz, having CAS No. 014808-60-7 and the chemical composition $SiO_2$, also called low-temperature quartz or α-quartz. It may also be described as "milled quartz" or Iquartz flour". It may be pure or, as described, for example, in http://de.wikipedia.orgwiki/Quarz, contaminated by traces of other elements. Typical impurities are, for example, $Al^{3+}$, $Na^+$, $K^+$, $Ca^{2+}$, $Mg^{2+}$ or comparatively small amounts of $Fe^{3+}$, $Ti^{4+}$, $P^{5+}$, $H^+$ and $Li^+$. Preference is given to using those naturally occurring quartz qualities having an iron content of less than 0.1% by weight, and preferably less than 0.06% by weight.

The ground quartz of the invention may preferably be converted to the particle sizes desired in accordance with the invention from naturally occurring quartz sand by a comminution method, such as grinding, and subsequent sifting and/or sieving.

The grinding/milling of the quartz to give ground quartz may preferably be effected in a mill, more preferably in a ball mill, most preferably in a ball mill lined with ceramic or rubber for avoidance of iron contamination.

The sifting of the ground quartz after milling is preferably effected in wind sifters, in which case the classification can be effected in one or more stages.

The inventive particle size distribution can be monitored according to desirable particle sizes by means of sieve analyses or by means of laser beam technology.

In the context of the present invention, the terms "quartz flour", "milled quartz" and "ground quartz" are used synonymously.

Useful starting materials for the grinding are in principle all naturally occurring quartzes.

Preferably in accordance with the invention, the ground quartz to be used may be provided with a surface modification or size (component B') based on aminoalkyltrialkoxysilane. In alternative or preferred embodiments, the quartz flour may be provided with additional surface modification or silane- or siloxane-based size, preferably with glycidyl-, carboxyl, alkenyl-, acryloyloxyalkyl- and/or methacryloyloxyalkyl-functionalized trialkoxysilanes or aqueous hydrolysates thereof and combinations thereof.

Most preferred as B') are surface modifications with aminoalkyltrialkoxysilanes, especially aminopropyltrimethoxysilane, aminobutyltrimethoxysilane, aminopropyltriethoxysilane, aminobutyltriethoxysilane or aqueous hydrolysates thereof, very especial preference being given to aminopropyltriethoxysilane.

The aminoalkyltrialkoxysilanes of component B') are preferably used for surface coating in amounts of about 0.01% by weight to about 1.5% by weight, more preferably in amounts of about 0.05% by weight to about 1.0% by weight, and most preferably in amounts of about 0.1% by weight to about 0.5% by weight, based on the quartz flour B).

The quartz used for the grinding may already have been treated with surface modification or size. It is likewise possible to treat the quartz for use in accordance with the invention with surface modification or size after the grinding.

Usable quartz flour suitable in accordance with the invention is Millisil® W12 from Quarzwerke GmbH, Frechen, a quartz flour obtained by iron-free grinding of quartz sand and subsequent wind sifting, having a d95 of 50 µm and a d50 of 16 µm.

Likewise suitable in accordance with the invention is Sikron® SF300 having a d95 of 34 µm and a d50 of 10 µm, likewise available from Quarzwerke GmbH, Frechen.

The quartz flour for use in accordance with the invention, as a result of the processing to give the inventive composition or to give mouldings made from the inventive composition or in the moulding, may have a smaller d95 or d50 than the ground particles originally used.

Component C)

According to "http://de.wikipedia.org/wiki/Faser-Kunststoff-Verbund", cut fibres, also referred to as short fibres, having a length of about 0.1 to about 1 mm, are distinguished from long fibres having a length of about 1 to about 50 mm and continuous fibres having a length L>about 50 mm. Short fibres are used in injection moulding technology and can be processed directly with an extruder. Long fibres can likewise still be processed in extruders. They are used on a large scale in fibre injection moulding. Long fibres are frequently added to thermosets as a filler. Continuous fibres are used in the form of rovings or fabric in fibre-reinforced plastics. Products comprising continuous fibres achieve the highest stiffness and strength values. Additionally supplied are ground glass fibres having a length after grinding typically of about 70 to about 200 µm.

According to the invention, chopped long glass fibres having a starting length of about 1 to about 50 mm, more preferably about 1 to about 10 mm, and most preferably about 2 to about 7 mm, may be used for component C). The glass fibres of component C) may, as a result of the processing to give the moulding composition or to give the product, have a lower d97 or d50 value in the moulding composition or in the product than the glass fibres originally used. Thus, the arithmetic mean of the glass fibre length after processing is frequently only about 150 µm to about 300 µm. In this case too, the particle size may be determined by laser diffractometry (see above).

Glass fibres for use with preference as component C) may have a fibre diameter of about 7 to about 18 µm, more preferably about 9 to about 15 µm. The glass fibres of component C), in a preferred embodiment, may be modified with a suitable size system or an adhesion promoter or adhesion promoter system. Preference is given to using a silane-based size system or adhesion promoter.

Particularly preferred silane-based adhesion promoters for the pretreatment are silane compounds of the general formula (I)

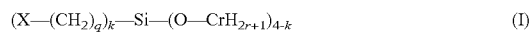

$$(X-(CH_2)_q)_k-Si-(O-CrH_{2r+1})_{4-k} \qquad (I)$$

in which
X is $NH_2$—, carboxyl-, HO— or

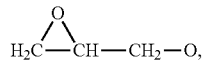

Q is an integer from 2 to 10, preferably 3 to 4,
r is an integer from 1 to 5, preferably 1 to 2, and
k is an integer from 1 to 3, preferably 1.

Especially preferred adhesion promoters are silane compounds from the group of aminopropyltrimethoxysilane, aminobutyltrimethoxysilane, aminopropyltriethoxysilane, aminobutyltriethoxysilane, and the corresponding silanes containing a glycidyl group or a carboxyl group as the X substituent, very especial preference being given to carboxyl groups.

For the modification of the glass fibres for use as component C), the adhesion promoters, preferably the silane compounds of formula (I), may be used preferably in amounts of about 0.05% to about 2% by weight, more preferably in amounts of about 0.25% to about 1.5% by weight and most preferably in amounts of about 0.5% to about 1% by weight, based in each case on 100% by weight of component C), According to "http://www.r-g.de/wiki/Glasfasern", glass fibres are produced in a melt spinning process (die drawing, rod drawing and die blowing processes). In the die drawing process, the hot mass of glass flows under gravity through hundreds of die bores in a platinum spinneret plate. The filaments can be drawn at a speed of 3-4 km/minute with unlimited length.

The person skilled in the art distinguishes between different types of glass fibres, some of which are listed here by way of example:
  E glass, the most commonly used material having an optimal cost-benefit ratio (E glass from R&G)
  H glass, hollow glass fibres for reduced weight (R&G hollow glass fibre fabric 160 g/m² and 216 g/m)
  R, S glass, for high mechanical demands (S2 glass from R&G)
  D glass, borosilicate glass for high electrical demands
  C glass, with increased chemical durability
  quartz glass, with high thermal stability Further examples can be found under "http://de.wikipedia.org/wiki/Glasfaser". E glass fibres have gained the greatest significance for reinforcement of plastics. E stands for electro-glass, since it was originally used in the electrical industry in particular.

For the production of E glass, glass melts are produced from pure quartz with additions of limestone, kaolin and boric acid. As well as silicon dioxide, they contain different amounts of various metal oxides. The composition determines the properties of the products. Preference is given in accordance with the invention to using at least one type of glass fibres from the group of E glass, H glass, R, S glass, D glass, C glass and quartz glasses, particular preference to using glass fibres made of E glass.

Glass fibres made of E glass are the most commonly used reinforcing material. The strength properties correspond to those of metals (for example aluminium alloys), the specific weight of laminates being lower than that of the metals. E glass fibres are non-combustible, heat-resistant up to about 400° C. and resistant to most chemicals and weathering influences.

Component D)
As component D), the inventive compositions may include melamine cyanurate [CAS No. 37640-57-6]. Melamine cyanurate is understood to mean the reaction product of preferably equimolar amounts of melamine and cyanuric acid or isocyanuric acid. These include all standard and commercially available product qualities. Examples of these include Melapur® MC 25 and Melapur® MC50 (from BASF, Ludwigshafen, Germany). The melamine cyanurate for use in accordance with the invention may preferably be particles having median particle diameters of about 0.1 µm to about 100 µm, more preferably of about 0.1 µm to about 30 µm, most preferably about 0.1 µm to about 7 µm, and can be surface-treated, or coated or sized with known compositions. These preferably include organic compounds which can be applied in monomeric, oligomeric and/or polymeric form to the melamine cyanurate. Especially preferably, it is possible to use coating systems based on silicon-containing compounds, especially organofunctionalized silanes or organosiloxanes. Coatings with inorganic components are likewise possible.

Component E)
Titanium dioxide [CAS No. 13463-67-7] for use as component E) may preferably have a median particle size of about 90 nm to about 2000 nm. Useful titanium dioxide pigments for the titanium dioxide for use as component E) in accordance with the invention may include those whose base structures can be produced by the sulphate (SP) or chloride (CP) method, and which have anatase and/or rutile structure, preferably rutile structure. The base structure need not be stabilized, but preference is given to a specific stabilization: in the case of the CP base structure by an Al doping of about 0.3-3.0% by weight (calculated as $Al_2O_3$) and an oxygen excess in the gas phase in the oxidation of the titanium tetrachloride to titanium dioxide of at least 2%; in the case of the SP base structure by a doping, preferably with Al, Sb, Nb or Zn. Particular preference is given to "light" stabilization with Al, or in the case of higher amounts of Al doping to compensation with antimony. In the case of use of titanium dioxide as white pigment in paints and coatings, plastics etc., it is known that unwanted photocatalytic reactions caused by UV absorption lead to breakdown of the pigmented material. This involves absorption of light in the near ultraviolet range by titanium dioxide pigments, forming electron-hole pairs, which produce highly reactive free radicals on the titanium dioxide surface. The free radicals formed result in binder degradation in organic media. Preference is given in accordance with the invention to lowering the photoactivity of the titanium dioxide by inorganic after treatment thereof, more preferably with oxides of Si and/or Al and/or Zr and/or through the use of Sn compounds.

Preferably, the surface of pigmentary titanium dioxide may be covered with amorphous precipitated oxide hydrates of the compounds $SiO_2$ and/or $Al_2O_3$ and/or zirconium oxide. The $Al_2O_3$ shell facilitates pigment dispersion in the polymer matrix; the $SiO_2$ shell makes it difficult for charges to be exchanged at the pigment surface and hence prevents polymer degradation.

According to the invention, the titanium dioxide is preferably provided with hydrophilic and/or hydrophobic organic coatings, especially with siloxanes or polyalcohols.

Titanium dioxide for use as component E) in accordance with the invention may preferably have a median particle size of about 90 nm to about 2000 nm, preferably about 200 nm to about 800 nm. The particle size may be determined by laser diffractometry (see above).

Commercially available products are, for example, Kronos® 2230, Kronos® 2225 and Kronos® vlp7000 from Kronos, Dallas, USA.

The titanium dioxide can be used directly as a powder or in the form of masterbatches, in which case the masterbatches are preferably based on polyamide. Alternatively, it is also possible to use titanium dioxide masterbatches based on polycarbonate, polybutylene terephthalate, polyethylene, maleic anhydride-grafted polyethylene and/or maleic anhydride-grafted polypropylene, and it is also possible to use a mixture of said polymers for the masterbatch.

Component F)

The lubricants and/or demoulding agents for use as component F) in a preferred embodiment of the inventive compositions may preferably be long-chain fatty acids, especially stearic acid or behenic acid, salts thereof, especially calcium stearate or zinc stearate, and the ester derivatives or amide derivatives thereof, especially ethylenebisstearylamide, montan waxes and low molecular weight polyethylene or polypropylene waxes.

Montan waxes in the context of the present invention are mixtures of straight-chain saturated carboxylic acids having chain lengths of about 28 to about 32 carbon atoms.

According to the invention, particular preference is given to using lubricants and/or demoulding agents from the group of the esters or amides of saturated or unsaturated aliphatic carboxylic acids having about 8 to about 40 carbon atoms with aliphatic saturated alcohols or amines having about 2 to about 40 carbon atoms, and metal salts of saturated or unsaturated aliphatic carboxylic acids having about 8 to about 40 carbon atoms.

Very particular preference is given to using at least one of the lubricant and/or demoulding agent from the group of ethylenebisstearylamide, calcium stearate and ethylene glycol dimontanate.

Especial preference is given to using calcium stearate [CAS No. 1592-23-0] or ethylenebisstearylamide [CAS No. 110-30-5].

Very especial preference is given to using ethylenebisstearylamide (Loxiol® EBS from Emery Oleochemicals).

Component G)

As component G), at least one laser absorber may be used. According to Kunststoffe 8, 2008, 119-121, these may include laser light absorbers, preferably for inscription of plastics products. The laser absorber for use as component G) may preferably be selected from the group of antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone. Particular preference is given to antimony trioxide and antimony tin oxide. Very particular preference is given to antimony trioxide.

The laser absorber, especially the antimony trioxide, can be used directly as a powder or in the form of masterbatches. Preferred masterbatches are those based on polyamide or those based on polybutylene terephthalate, polyethylene, polypropylene, polyethylene-polypropylene copolymer, maleic anhydride-grafted polyethylene and/or maleic anhydride-grafted polypropylene, it being possible to use the polymers for the antimony trioxide masterbatch individually or in a mixture. Very particular preference is given to using antimony trioxide in the form of a nylon-6-based masterbatch.

The laser absorber can be used individually or as a mixture of a plurality of laser absorbers.

Laser absorbers can absorb laser light of a particular wavelength. In practice, this wavelength is between about 157 nm and about 10.6 µm. Examples of lasers of this wavelength are described in WO2009/003976 A1. Preference is given to using Nd:YAG lasers, with which it is possible to achieve wavelengths of 1064, 532, 355 and 266 nm, and $CO_2$ lasers.

Component H)

In one embodiment, the inventive compositions may include, as component H), as well as melamine cyanurate (component D)), at least one flame retardant other than component D), preferably a halogen-free and/or phosphorus-free flame retardant.

Preferred halogen-free and/or phosphorus-free flame retardants are nitrogen-containing flame retardants, which are used individually or in a mixture.

Preferred nitrogen-containing flame retardants are the reaction products of trichlorotriazine, piperazine and morpholine according to CAS No. 1078142-02-5, especially MCA PPM Triazine HF from MCA Technologies GmbH, Biel-Benken, Switzerland, and condensation products of melamine, for example melem, melam, melon or more highly condensed compounds of this type. Preferred inorganic nitrogen-containing compounds are ammonium salts.

In addition, it is also possible to use salts of aliphatic and aromatic sulphonic acids and mineral flame retardant additives such as aluminium hydroxide and/or magnesium hydroxide, Ca—Mg carbonate hydrates (e.g. DE-A 4 236 122).

Also useful are flame retardant synergists from the group of the oxygen-, nitrogen- or sulphur-containing metal compounds, preferably zinc oxide, zinc borate, zinc stannate, zinc hydroxystannate, zinc sulphide, molybdenum oxide, magnesium oxide, magnesium carbonate, calcium carbonate, calcium oxide, titanium nitride, boron nitride, magnesium nitride, zinc nitride, zinc phosphate, calcium phosphate, calcium borate, magnesium borate or mixtures thereof.

In an alternative embodiment, it is also possible to use, as component H)—if required—halogen-containing and/or phosphorus-containing flame retardants.

Preferred halogen-containing flame retardants are standard organic halogen compounds, more preferably ethylene-1,2-bistetrabromophthallmide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ethers, which can be used alone or in combination with synergists, especially antimony trioxide or antimony pentoxide.

Preferred phosphorus-containing flame retardants are red phosphorus, metal phosphinates, especially aluminium phosphinate or zinc phosphinate, metal phosphonates, especially aluminium phosphonate, calcium phosphonate or zinc phosphonate, derivatives of the 9,10-dihydro-9-oxa-10-phosphaphenanthrene 10-oxides (DOPO derivatives), resorcinol bis(diphenyl phosphate) (RDP), including oligomers, and bisphenol A bis(diphenyl phosphate) (BDP) including oligomers, and also zinc bis(diethylphosphinate), aluminium tris(diethylphosphinate), melamine phosphate, melamine pyrophosphate, melamine polyphosphate, melamine poly (aluminium phosphate), melamine poly(zinc phosphate) or phenoxyphosphazene oligomers and mixtures thereof.

Further flame retardants for use as component H) are char formers, more preferably phenol-formaldehyde resins, polycarbonates, polyimides, polysulphones, polyether sulphones or polyether ketones, and anti-dripping agents, especially tetrafluoroethylene polymers.

The flame retardants can be added in pure form, or else via masterbatches or compactates.

Component K)

As component K), the compositions may include at least one further filler or reinforcer other than components B) and C).

In this case, it is also possible to use mixtures of two or more different fillers and/or reinforcers, preferably based on talc, mica, silicate, amorphous quartz glass, wollastonite, kaolin, amorphous silicas, nanoscale minerals, more preferably montmorillonites or nano-boehmite, magnesium carbonate, chalk, feldspar, barium sulphate and/or fibrous fillers and/or reinforcers based on carbon fibres or else untreated, surface-modified or sized spherical fillers and reinforcers made from glass. Preference is given to using mineral particulate fillers based on talc, mica, silicate, wollastonite, kaolin, amorphous silicas, magnesium carbonate, chalk, feldspar and/or barium sulphate. Particular preference is given to using mineral particulate fillers based on talc, wollastonite and/or kaolin.

Particular preference is additionally also given to using acicular mineral fillers. Acicular mineral fillers are understood in accordance with the invention to mean a mineral filler with a highly pronounced acicular character. Preference is given to acicular wollastonites. The acicular mineral filler preferably has an aspect ratio of about 2:1 to about 35:1, more preferably about 3:1 to about 19:1, especially preferably about 4:1 to about 12:1. The median particle size of the acicular mineral fillers is preferably less than 20 µm, more preferably less than 15 µm, especially preferably less than 10 µm, determined with a CILAS GRANULOMETER.

Particular preference is also given to using non-fibrous and non-foamed ground glass having a particle size distribution having a d90 of about 5 to about 250 µm, preferably about 10 to about 150 µm, more preferably about 15 to about 80 µm, most preferably about 16 to about 25 µm, and a length of about 0.01 to about 0.5 mm. Preference is given to using non-fibrous and non-foamed ground glass additionally having a d10 of about 0.3 to about 10 µm, preferably about 0.5 to about 6 µm, more preferably about 0.7 to about 3 µm. Very particular preference is given to such non-fibrous and non-foamed ground glass as also has a d50 of about 3 to about 50 µm, preferably about 4 to about 40 µm, more preferably about 5 to 30 µm.

With regard to the d10, d50 and d90 values, the determination thereof and the meaning thereof, however, reference is made to Chemie Ingenieur Technik (72) p. 273-276, 3/2000, Wiley-VCH Verlags GmbH, Weinheim, 2000, according to which the d10 is that particle size below which 10% of the amount of particles lie, d50 is that particle size below which 50% of the amount of particles lie (median value) and the d90—entirely analogously to the above-described d95—is that particle size below which 90% of the amount of particles lie.

Preferably, a non-fibrous and non-foamed ground glass for use in accordance with the invention has a median particle size of about 3 to about 60 µm, especially preferably about 15 to about 30 µm. The figures for the particle size distribution and for the particle sizes are based here on so-called surface-based particle sizes, in each case prior to incorporation into the thermoplastic moulding composition. In this context, the diameters of the surfaces of the respective glass particles are expressed in relation to the surfaces of imaginary spherical particles (spheres). This is accomplished with a particle size analyser that works by the principle of laser dimming from Ankersmid (Eye Tech® including the EyeTech® software and ACM-104 measurement cell, Ankersmid Lab, Oosterhout, the Netherlands). Alternatively, the laser diffractometry in accordance with ISO standard 13320 already described above can be used to determine the particle size.

Preferably in accordance with the invention, the non-fibrous and non-foamed ground glass is in particulate, non-cylindrical form and has a length to thickness ratio of less than about 5, preferably less than about 3, more preferably less than about 2. The value of zero is of course impossible.

For delimitation of the present invention, foamed glass, frequently also called expanded glass, is understood to mean a glass in which gas bubbles, for example of air or carbon dioxide, are enclosed. However, this inclusion of gas, in contrast to the non-foamed glass for use in accordance with the invention, leads to a reduction in density. The non-foamed and non-fibrous ground glass for use in accordance with the invention thus does not undergo any reduction in density through any inclusions of gas.

For delimitation of the present invention, fibrous glass is understood to mean a glass geometry having a cylindrical or oval cross section having an aspect ratio (length/diameter ratio) greater than about 5. The non-foamed and non-fibrous ground glass for use as component B) is therefore additionally characterized in that it does not have the glass geometry typical of fibrous glass with a cylindrical or oval cross section having an aspect ratio (length/diameter ratio) greater than about 5.

The non-foamed and non-fibrous ground glass for use in accordance with the invention is preferably obtained by grinding glass with a mill, preferably a ball mill and more preferably with subsequent sitting or screening. Useful starting materials include all geometric forms of solidified glass.

Preferred starting materials for the grinding to give non-fibrous and non-foamed ground glass for use in accordance with the invention are also glass wastes as obtained especially in the production of glass products as unwanted by-product and/or as off-spec main product. These especially include waste glass, recycled glass and broken glass as can be obtained especially in the production of window or bottle glass, and in the production of glass-containing filers and reinforcers, especially in the form of what are called melt cakes. The glass may be coloured, although preference is given to non-coloured glass as starting material.

Useful starting glass for the grinding in principle includes all glass types as described, for example, in DIN 1259-1. Preference is given to soda-lime glass, float glass, quartz glass, lead crystal glass, borosilicate glass, A glass and E glass, particular preference being given to soda-lime glass, borosilicate glass, A glass and E glass, very particular preference to A glass and E glass, especially E glass. For the physical data and composition of E glass, reference may be made to "http://wiki.r-g.de/index.php?title=Glasfasern". Non-fibrous and non-foamed ground E glass for use with especial preference in accordance with the invention has at least one of the following features specified in Table 1:

TABLE 1

| Properties of E glass | Unit | E glass |
|---|---|---|
| Density | $g/cm^2$ at 20° C. | 2.6 |
| Tensile strength | MPa | 3400 |

TABLE 1-continued

| | | |
|---|---|---|
| Tensile modulus of elasticity | GPa | 73 |
| Elongation at break | % | 3.5-4 |

| Chemical composition | Unit | Value |
|---|---|---|
| $SiO_2$ | % | 53-55 |
| $Al_2O_3$ | % | 14-15 |
| $B_2O_3$ | % | 6-8 |
| CaO | % | 17-22 |
| MgO | % | <5 |
| $K_2O$, $Na_2O$ | % | <1 |
| Other oxides | % | about 1 |

For the production of the non-foamed and non-fibrous glass for use in accordance with the invention, particular preference is likewise given to glass types in which the $K_2O$ content is less than or equal to about 2% by weight, based on all the components of the glass. The non-foamed and non-fibrous ground glass for use in accordance with the invention can be purchased, for example, from VitroMinerals, Covington, Ga., USA. It is supplied as CS Glass Powder in the specifications CS-325, CS-500 and CS-600, or else as LA400 (see also "www.glassfillers.com" or Chris DeArmitt, Additives Feature, Mineral Fillers, COMPOUNDING WORLD, February 2011, pages 28-38 or "www.compoundingworld.com").

The ground glass for use as a filler preferably has a density (not bulk densityl) to ASTM C 693 of about 2400 to about 2700 $kg/m^3$, more preferably about 2400 to about 2600 kg/m, and is therefore distinctly different from foamed glass (density=100-165 $kg/m^3$), foamed glass pellets (density=130-170 kg/m) and expanded glass (density=110-360 kg/m); see also AGY Produktbroschüre Pub. No. LIT-2006-111 R2 (02/06).

Preferably in accordance with the invention, the non-foamed and non-fibrous ground glass to be used may be provided with surface modification or sizing (component B') based on aminoalkyltrialkoxysilane. In alternative or preferred embodiments, the non-foamed and non-fibrous ground glass may be provided with additional surface modification or sizing based on silane or siloxane, preferably with glycidyl-, carboxyl-, alkenyl-, acryloyloxyalkyl- and/or methacryloyloxyalkyl-functionalized trialkoxysilanes or aqueous hydrolysates thereof, and combinations thereof.

Preferred aminoalkyltrialkoxysilanes are aminopropyltrimethoxysilane, aminobutyltrimethoxysilane, aminopropyltriethoxysilane, aminobutyltriethoxysilane or aqueous hydrolysates thereof, very particular preference being given to aminopropyltriethoxysilane.

The aminoalkyltrialkoxysilanes are preferably used for surface coating in amounts of about 0.01% by weight to about 1.5% by weight, more preferably in amounts of about 0.05% by weight to about 1.0% by weight and most preferably in amounts of about 0.1% by weight to about 0.5% by weight, based on the non-foamed and non-fibrous ground glass.

The starting glass for the grinding may already have been given surface modification or sizing treatment. It is likewise possible for the non-foamed and non-fibrous ground glass for use in accordance with the invention to be given surface modification or sizing treatment after the grinding.

It is especially possible to use MF7900 from Lanxess Deutschland GmbH, Cologne, a non-fibrous and non-foamed ground glass based on E glass containing about 0.1% by weight having a d90 of 54 µm, a d50 of 14 µm, a d10 of 2.4 µm, and having a median particle size of 21 µm, based in each case on the particle surface area, containing about 0.1% by weight of triethoxy(3-aminopropyl)silane size.

The non-foamed and non-fibrous ground glass for use in accordance with the invention may, as a result of the processing to give the inventive composition or to give products from the inventive composition, or in the product, have a smaller d90 or d50 or d10 or a smaller median particle size than the ground particles originally used.

Apart from the non-foamed and non-fibrous ground glass, the other fillers and/or reinforcers mentioned as component K), in a preferred embodiment, have also been surface-modified, preferably with an adhesion promoter or adhesion promoter system, more preferably based on silane. However, the pretreatment is not absolutely necessary. Useful adhesion promoters likewise include the silane compounds of the general formula (I) already described above.

For the modification of component K), the silane compounds are generally used in amounts of about 0.05% to about 2% by weight, preferably about 0.25% to about 1.5% by weight and especially about 0.5% to about 1% by weight, based on the mineral filler for surface coating.

The fillers of component K) may also, as a result of the processing to give the composition or to give the product from the composition, or in the product, have a smaller d97 or d50 than the fillers originally used.

Component L)

Additives for use with preference as component L) may include antioxidants, UV stabilizers, gamma ray stabilizers, hydrolysis stabilizers, thermal stabilizers, antistats, emulsifiers, nucleating agents, plasticizers, processing auxiliaries, impact modifiers, dyes, pigments and elastomer modifiers. The additives can be used alone or in a mixture, or in the form of masterbatches.

Preference is given to using, as antioxidant, Lowinox® HD 98, 3,3'-bis(3,5-di-tert-butyl-4-hydroxyphenyl)-N,N'-hexamethylenedipropionamide [CAS No. 23128-74-7].

UV stabilizers used are preferably substituted resorcinols, salicylates, benzotriazoles and benzophenones.

Colourants used are preferably inorganic pigments, especially ultramarine blue, iron oxide, titanium dioxide, zinc sulphide or carbon black, and also organic pigments, preferably phthalocyanines, quinacridones, perylenes, and dyes, preferably nigrosin and anthraquinones.

Thermal stabilizers used are preferably sterically hindered phenols and/or phosphites, hydroquinones, aromatic secondary amines such as diphenylamines, substituted resorcinols, salicylates, benzotriazoles and benzophenones, and also variously substituted representatives of these groups or mixtures thereof. Particular preference is given to using sterically hindered phenols alone or in combination with phosphites, very particular preference being given to the use of N,N'-bis[3-(3',5'-di-tert-buty-4'-hydroxyphenyl)propionyl]hexamethylenediamine [CAS No. 23128-74-7](e.g. Irganox® 1098 from BASF SE, Ludwigshafen, Germany).

Nucleating agents used are preferably sodium phenylphosphinate or calcium phenylphosphinate, aluminium oxide or silicon dioxide, and most preferably talc, this enumeration being non-exclusive.

Flow auxiliaries used are preferably copolymers of at least one α-olefin with at least one methacrylic ester or acrylic ester of an aliphatic alcohol. Particular preference is given to copolymers in which the α-olefin is formed from ethene and/or propene and the methacrylic ester or acrylic ester contains, as alcohol component, linear or branched alkyl groups having 6 to 20 carbon atoms. Very particular preference is given to 2-ethylhexyl acrylate. Features of the copolymers suitable in accordance with the invention as flow auxiliaries are not just the composition but also the low molecular weight. Accordingly, suitable copolymers for the compositions that are to be protected from thermal degradation in accordance with the invention are particularly those which have an MFI value measured at 190° C. and a load of 2.16 kg of at least 100 g/10 min, preferably of at least 150 g/10 min, more preferably of at least 300 g/10 min. The MFI, melt flow index, serves to characterize the flow of a melt of a thermoplastic and is subject to the standards ISO 1133 or ASTM D 1238. The MFI, and all figures relating to MFI in the context of the present invention, relate or were measured or determined in a standard manner to ISO 1133 at 190° C. with a test weight of 2.16 kg.

Plasticizers for use with preference as component L) are dioctyl phthalate, dibenzyl phthalate, butyl benzyl phthalate, hydrocarbon oils or N-(n-butyl)benzenesulphonamide.

The elastomer modifiers for use as component L) preferably include one or more graft polymers of L.1 about 5% to about 95% by weight, preferably about 30% to about 90% by weight, of at least one vinyl monomer and L.2 about 95% to about 5% by weight, preferably about 70% to about 10% by weight, of one or more graft bases having glass transition temperatures of less than about 10° C., preferably less than about 0° C., and more preferably less than about −20° C.

The graft base L.2 generally has a median particle size (d50) of about 0.05 to about 10 μm, preferably about 0.1 to about 5 μm, more preferably about 0.2 to about 1 μm.

Monomers for L.1 are preferably mixtures of L.1.1 about 50% to about 99% by weight of vinylaromatics and/or ring-substituted vinylaromatics, especially styrene, α-methylstyrene, p-methylstyrene, p-chlorostyrene, and/or ($C_1$-$C_8$)-alkyl methacrylates, especially methyl methacrylate, ethyl methacrylate, and L.1.2 about 1% to about 50% by weight of vinyl cyanides, especially unsaturated nitriles such as acrylonitrile and methacrylonitrile, and/or ($C_1$-$C_8$)-alkyl (meth)acrylates, especially methyl methacrylate, glycidyl methacrylate, n-butyl acrylate, t-butyl acrylate, and/or derivatives, especially anhydrides and imides, of unsaturated carboxylic acids, especially maleic anhydride and N-phenylmaleimide.

Preferred monomers L.1.1 are selected from at least one of the monomers styrene, α-methylstyrene and methyl methacrylate; preferred monomers L.1.2 are selected from at least one of the monomers acrylonitrile, maleic anhydride, glycidyl methacrylate and methyl methacrylate.

Particularly preferred monomers are L.1.1 styrene and L.1.2 acrylonitrile.

Graft bases L.2 suitable for the graft polymers for use in the elastomer modifiers are, for example, diene rubbers, EPDM rubbers, i.e. those based on ethylene/propylene, and optionally diene, and also acrylate, polyurethane, silicone, chloroprene and ethylene/vinyl acetate rubbers. EPDM stands for ethylene-propylene-diene rubber.

Preferred graft bases L.2 are diene rubbers, especially based on butadiene, isoprene etc., or mixtures of diene rubbers or copolymers of diene rubbers or mixtures thereof with further copolymerizable monomers, especially as per L.1.1 and L.1.2, with the proviso that the glass transition temperature of component L.2 is less than about 10° C., preferably less than about 0° C., and more preferably less than about −10° C.

Particularly preferred graft bases L.2 are ABS polymers (emulsion, bulk and suspension ABS), where ABS stands for acrylonitrile-butadiene-styrene, as described, for example, in DE-A 2 035 390 (=U.S. Pat. No. 3,644,574) or in DE-A 2 248 242 (=GB-A 1 409 275) or in Ullmann, Enzyklopädie der Technischen Chemie [Encyclopedia of Industrial Chemistry], vol. 19 (1980), p. 280 if. The gel content of the graft base L.2 is preferably at least about 30% by weight, more preferably at least about 40% by weight (measured in toluene).

The elastomer modifiers or graft polymers are prepared by free-radical polymerization, preferably by emulsion, suspension, solution or bulk polymerization, especially by emulsion or bulk polymerization.

Particularly suitable graft rubbers are also ABS polymers, which are prepared by redox initiation with an initiator system composed of organic hydroperoxide and ascorbic acid according to U.S. Pat. No. 4,937,285.

Since, as is well known, the graft monomers are not necessarily grafted completely onto the graft base in the grafting reaction, according to the invention, graft polymers are also understood to mean those products which are obtained through (co)polymerization of the graft monomers in the presence of the graft base and occur in the workup as well.

Likewise suitable acrylate rubbers are based on graft bases L.2, which are preferably polymers of alkyl acrylates, optionally with up to about 40% by weight, based on L.2, of other polymerizable, ethylenically unsaturated monomers. The preferred polymerizable acrylic esters include $C_1$-$C_8$-alkyl esters, preferably methyl, ethyl, butyl, n-octyl and 2-ethylhexyl esters; haloalkyl esters, preferably halo-$C_1$-$C_8$-alkyl esters, such as chloroethyl acrylate, glycidyl esters and mixtures of these monomers. Particular preference is given here to graft polymers having butyl acrylate as core and methyl methacrylate as shell, especially Paraloid® EXL2300, from Dow Corning Corporation, Midland Mich., USA.

For crosslinking, it is possible to copolymerize monomers having more than one polymerizable double bond. Preferred examples of crosslinking monomers are esters of unsaturated monocarboxylic acids having about 3 to about 8 carbon atoms and unsaturated monohydric alcohols having about 3 to about 12 carbon atoms or of saturated polyols having about 2 to about 4 OH groups and about 2 to about 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes, but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylthexahydro-s-triazine, triallylbenzenes. The amount of the crosslinked monomers is preferably about 0.02% to about 5% by weight, especially about 0.05% to about 2% by weight, based on the graft base L.2.

In the case of cyclic crosslinking monomers having at least 3 ethylenically unsaturated groups, it is advantageous to restrict the amount to below about 1% by weight of the graft base L.2.

Preferred "other" polymerizable, ethylenically unsaturated monomers which, alongside the acrylic esters, may optionally serve for preparation of the graft base L.2 are acrylonitrile, styrene, α-methylstyrene, acrylamide, vinyl $C_1$-$C_6$-alkyl ethers, methyl methacrylate, glycidyl methacrylate, butadiene. Preferred acrylate rubbers as graft base L.2 are emulsion polymers having a gel content of at least about 60% by weight.

Further preferentially suitable graft bases according to L.2 are silicone rubbers having graft-active sites, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

As well as elastomer modifiers based on graft polymers, it is likewise possible to use elastomer modifiers which are not based on graft polymers and have glass transition temperatures of less than about 10° C., preferably less than about 0° C., and more preferably less than about −20° C. These preferably include elastomers having a block copolymer structure, and additionally thermoplastically meltable elastomers, especially EPM, EPDM and/or SEBS rubbers (EPM=ethylene-propylene copolymer, EPDM=ethylene-propylene-diene rubber and SEBS=styrene-ethene-butene-styrene copolymer).

Process

The present invention additionally relates to a process for producing products, preferably electrical components, more preferably residual current circuit breakers and other circuit breakers, most preferably circuit breakers having rated currents greater than about 16 A, especially preferably circuit breakers having rated currents greater than about 32 A, very especially preferably circuit breakers having rated currents greater than about 64 A, through use of the inventive compositions in injection moulding processes, including the special methods of GIT (gas injection technology), WIT (water injection technology) and PIT (projectile injection technology), in extrusion processes, including in profile extrusion, or in blow moulding processes.

For production of these products, the individual components of the inventive composition are first mixed in at least one mixing tool and this mixture, which is then in the form of a moulding composition, is either fed through at least one mixing tool outlet directly to further processing or is discharged as a strand and cut into pellets of the desired length by means of a pelletizer, preferably a rotating bladed roller, in order to be available for a later processing operation.

Since most processors require plastics in the form of pellets, pelletizing is playing an ever more important role. A basic distinction is made between hot cutting and cold cutting. This results in different particle forms according to the processing. In the case of hot cutting, the pellets are obtained in beads or lenticular form; in the case of cold cutting, the pellets are obtained in cylinder forms or cube forms. Inventive compositions in pellet form are preferably obtained by cold cutting.

The person skilled in the art is at liberty to use different mixing tools suitable for achieving an optimal mixing outcome in terms of a mixture of the components in the compositions for use in accordance with the invention. An extruder is a preferred mixing tool in the context of the present invention. Preferred extruders are single-screw extruders or twin-screw extruders and the respective subgroups, most preferably conventional single-screw extruders, conveying single-screw extruders, contra-rotating twin-screw extruders or co-rotating twin-screw extruders. These are familiar to those skilled in the art from Technische Thermoplaste 4. Polyamide [Industrial Thermoplastics, 4. Polyamides], eds.: G. W. Becker and D. Braun, Carl Hanser Verlag, 1998. p. 311-314 and K. Brast, Thesis "Verarbeitung von Langfaser-verstärkten Thermoplasten im direkten Plastifizier-/Pressverfahren" [Processing of Long-Fibre Reinforced Thermoplastics Using the Direct Strand-Deposition Process], Rheinisch-Westfälische Technische Hochschule Aachen, 2001, p. 30-33.

The compositions present in the form of a moulding composition or pellets in accordance with the invention are ultimately used to produce the inventive products, preferably electrical or electronic products, by moulding methods. Preferred moulding methods are injection moulding or extrusion.

Inventive processes for producing products by extrusion or injection moulding work preferably at melt temperatures of about 230 to about 330° C., more preferably at melt temperatures of about 250 to 300° C., and preferably additionally at pressures of not more than about 2500 bar, more preferably at pressures of not more than about 2000 bar, most preferably at pressures of not more than about 1500 bar and especially preferably at pressures of not more than about 750 bar.

The process of injection moulding features melting (plasticization) of the inventive composition, preferably in pellet form, in a heated cylindrical cavity, and injection thereof as an injection moulding material under pressure into a temperature-controlled cavity. After the cooling (solidification) of the material, the injection moulding is demoulded. This process may include the steps of:
1. Plasticization/melting
2. Injection phase (filling operation)
3. Hold pressure phase (owing to thermal contraction in the course of crystallization)
4. Demoulding.

An injection moulding machine consists of a closure unit, the injection unit, the drive and the control system. The closure unit includes fixed and movable platens for the mould, an end platen, and tie bars and drive for the movable mould platen (toggle joint or hydraulic closure unit).

An injection unit comprises the electrically heatable barrel, the drive for the screw (motor, gearbox) and the hydraulics for moving the screw and the injection unit. The task of the injection unit is to melt the composition for use in accordance with the invention, especially in the form of pellets, to meter it, to inject it and to maintain the hold pressure (owing to contraction). The problem of the melt flowing backward within the screw (leakage flow) is solved by non-return valves.

In the injection mould, the incoming melt is then separated and cooled, and hence the component to be produced is produced. Two halves of the mould are always needed for this purpose. In injection moulding, the following functional systems are distinguished:
  runner system
  shaping inserts
  venting
  machine casing and force absorber
  demoulding system and movement transmission
  temperature control The special injection moulding methods of GIT (gas injection technology), WIT (water injection technology) and projectile injection technology (PIT) are specialized injection moulding methods for production of hollow workpieces. A difference from standard injection moulding is a specific working step towards the end of the mould filling phase or after a defined partial filling of the casting mould. In the method-specific working step, a process medium is injected through an injector into the molten core of the preform to form a cavity. This medium is gas—generally nitrogen—In the case of GIT, and water in the case of WIT.

In the case of PIT, a projectile is propelled into the molten core and a cavity is formed in this way.

In contrast to injection moulding, extrusion uses a continuous shaped polymer strand, comprising the inventive composition, in an extruder, the extruder being a machine for producing shaped thermoplastics. The following phases are distinguished:
single-screw extruder and twin-screw extruder and the respective sub-groups,
conventional single-screw extruder, conveying single-screw extruder,
contra-rotating twin-screw extruder and co-rotating twin-screw extruder.

Profiles in the context of the present invention are components or parts having identical cross sections over their entire length. They can be produced in a profile extrusion method. The basic method steps in the profile extrusion method may include:
1. plasticizing and providing the thermoplastic melt in an extruder,
2. extruding the thermoplastic melt strand through a calibration sleeve having the cross section of the profile to be extruded,
3. cooling the extruded profile on a calibrating table,
4. transporting the profile onward using a draw system beyond the calibration table,
5. cutting the previously continuous profile to length in a cutting system,
6. collecting the profiles which have been cut to length on a collecting table.

A description of the profile extrusion of nylon-6 and nylon-6,6 is given in Kunststoff-Handbuch [Plastics Handbook] 3/4, Polyamide [Polyamides], Carl Hanser Verlag, Munich 1998, pages 374-384.

Blow moulding methods in the context of the present invention are preferably standard extrusion blow moulding, 3D extrusion blow moulding, suction blow moulding methods, and sequential coextrusion.

The basic method steps in standard extrusion blow moulding may include, according to Thielen, Hartwig, Gust, "Blasformen von Kunststoffhohlkörpern" [Blow Moulding of Hollow Plastics Bodies], Carl Hanser Verlag, Munich, 2006, pages 15 to 17:
1. plasticizing and providing the thermoplastic melt in an extruder,
2. deflecting the melt in a vertical flowing movement in the downward direction and forming a tubular melt "parison",
3. enclosing the suspended parison by means of a mould generally consisting of two half-shells, the blow mould,
4. inserting a blowing mandrel or one or more blowing pin(s),
5. blowing the plastic parison against the cooled wall of the blow mould, where the plastic cools and solidifies and takes on the ultimate form of the moulding,
6. opening the mould and demoulding the blow-moulded part,
7. removing the pinched-off "flash" wastes at either end of the blow moulding.

Further post-processing steps may follow.

By means of standard extrusion blow moulding, it is also possible to produce products having a complex geometry and multiaxial curvature. In that case, however, products which contain a large proportion of excess, pinched-off material and have a weld seam in large regions are obtained.

In 3D extrusion blow moulding, also referred to as 3D blow moulding, therefore, weld seams are avoided and material use is reduced by using specific devices to deform and manipulate a parison having a diameter matched to the article cross section, and then introducing it directly into the blow mould cavity. The remaining pinch seam is therefore reduced to a minimum at the ends of the article (Thielen, Hartwig, Gust, "Blasformen von Kunststoffhohlkörpern", Carl Hanser Verlag, Munich 2006, pages 117-122).

In the suction blow moulding method, also referred to as suction blowing, the parison is conveyed directly out of the tubular die head into the closed blow mould and "sucked" through the blow mould by means of an air stream. After the lower end of the parison has emerged from the blow mould, it is pinched off at the top and bottom by means of closure elements, and this is followed by the blowing and cooling procedure (Thielen, Hartwig, Gust, "Blasformen von Kunststoffhohlkörpern", Carl Hanser Verlag, Munich 2006, page 123).

Use

The present application also provides for the use of the inventive compositions as moulding compositions in injection moulding processes, including the special methods of GIT (gas injection technology), WIT (water injection technology) and PIT (projectile injection technology), in extrusion processes, including in profile extrusion, in blow moulding processes, more preferably standard extrusion blow moulding, 3D extrusion blow moulding methods or suction blow moulding methods, in order to produce inventive products therefrom.

The present invention also relates to the use of the inventive compositions for production of products, preferably of electrical components, more preferably of residual current circuit breakers and other circuit breakers, most preferably circuit breakers having rated currents greater than about 16 A, especially preferably circuit breakers having rated currents greater than about 32 A, very especially preferably circuit breakers having rated currents greater than 64 A.

The present invention is even directed to a method of using ground quartz obtained from naturally occurring quartz in combination with glass fibers, melamine cyanurate and optionally titanium dioxide for improving at least one property of compositions based on polyamides, such as PA 6 or PA 66 in relation to heat resistance, flame retardancy in the glow wire test to IEC60695-2-12 and isotropic shrinkage characteristics.

It will be understood that the specification and examples are illustrative but not limitative of the present invention and that other embodiments within the spirit and scope of the invention will suggest themselves to those skilled in the art.

Examples

To demonstrate the improvements in properties described in accordance with the invention, corresponding polymer compositions were first made up by compounding. For this purpose, the individual components according to table 2 were mixed in a twin-screw extruder (ZSK 25 Compounder from Coperion Werner & Pfleiderer (Stuttgart, Germany)) at temperatures between 240 and 280° C., discharged as a strand, cooled until pelletizable and pelletized. After drying (generally for two days at 70° C. in a vacuum drying cabinet), the pellets were processed at temperatures in the range from 240 to 280° C. to give standard test specimens for the respective tests.

The glow wire stability was determined using the GWFI (glow wire flammability index) glow wire test to IEC 60695-2-12 using round blanks having a diameter of 80 mm and a thickness of 0.75 mm.

Heat distortion resistance was determined to ISO 75-1, -2 with an applied flexural stress of 1.8 MPa (HDT-A) using test specimens of dimensions 80 mm·10 mm·4 mm.

Shrinkage during processing was determined, in parallel and transverse to injection direction in each case, to ISO 294-4 using test specimens of dimensions 60 mm·60 mm·2 mm at a melt temperature of 260° C. and a mould temperature of 80° C. at hold pressure 600 bar.

Subsequently, as a measure of isotropy, warpage was calculated as the quotient of shrinkage during processing parallel to injection direction and shrinkage during processing transverse to injection direction. Values above 0.8 for the isotropy thus calculated suggest low-warpage materials.

For example, a commercial nylon-6 having 30% by weight of glass fibres has shrinkage during processing of 0.3%/0.7% [parallel/transverse], which then leads to an isotropy value of only 0.4 according to the above formula and thus means severe warpage.

The following were used in the experiments:

Component A): nylon-6 (Durethan® B26, from Lanxess Deutschland GmbH, Cologne, Germany)

Component B): ground quartz [CAS No. 014808-60-7] having a d95 of 50 μm and a d50 of 16 μm Component C): CS 7928 chopped glass fibres from Lanxess Deutschland GmbH, Cologne, Germany [median fibre diameter 11 μm, median fibre length 4.5 mm, E glass]

Component D): melamine cyanurate [CAS No. 37640-57-6](Melapur® MC25, from BASF, Ludwigshafen, Germany)

Component E): Titanium dioxide, Kronos® 2230 from Kronos, Dallas, USA.

Component H): ethylenebisstearylamide [CAS No. 110-30-5] in the form of Loxiol® EBS from Emery Oleochemicals Component L): Lowinox® HD 98-50 D-TDS, 3,3'-bis(3,5-di-tert-butyl-4-hydroxyphenyl)-N,N'-hexamethylenedipropionamide [CAS No. 23128-74-7]

TABLE 2

| Components | | 1 |
|---|---|---|
| A | [%] | 67.7 |
| B | [%] | 15 |
| C | [%] | 5 |
| D | [%] | 10 |
| E | [%] | 1.5 |
| H | [%] | 0.3 |
| L | [%] | 0.5 |
| GWFI (0.75 mm) | [° C.] | 960 |
| HDT A | [° C.] | 135 |
| Shrinkage during processing (parallel) | [%] | 0.8 |
| Shrinkage during processing (transverse) | [%] | 0.9 |
| Isotropy [parallel/transverse] | | 0.9 |

Figures for the components in % by weight are based on the overall moulding composition.

The example in Table 2 shows that the inventive composition attains the maximum temperature of 960° C. in the glow wire test even in the case of test specimens of thickness only 0.75 mm, at the same time has a very low tendency to warpage with an isotropy above 0.8, and nevertheless has heat resistances to HDT A above 130° C.

What is claimed is:

1. A polyamide composition having improved heat resistance, the composition comprising:
    A) about 5% to about 96.9% by weight of polyamide;
    B) about 1% to about 60% by weight of quartz powder, wherein the quartz powder is a powder of naturally occurring quartz crystals and not of quartz glass, and the powder particles have a d95 of about 5 to about 250 μm;
    C) about 2% to about 8% by weight of chopped long glass fibers having a starting length of about 1 to about 50 mm; and
    D) about 0.1% to about 40% by weight of melamine cyanurate,
    with the proviso that the composition does not contain ground glass, and does not contain phosphorous-containing flame retardants.

2. The composition according to claim 1, wherein:
    the polyamide comprises at least one of nylon-6 and nylon-6,6, and
    the composition further comprises, in addition to components A), B), C) and D), at least one of:
        E) titanium dioxide;
        F) at least one of a lubricant and a demoulding agent;
        G) at least one laser absorber;
        H) at least one further flame retardant other than melamine cyanurate and phosphorous-containing flame retardants; and
        K) at least one filler and/or reinforcer other than components B) and C).

3. The composition according to claim 1, further comprising, in addition to components A), B), C) and D), at least one of:
    E) about 0.01% to about 30% by weight of the titanium dioxide;
    F) about 0.01% to about 5% by weight of the at least one of a lubricant and a demoulding agent;
    G) about 0.01% to about 10% by weight of the at least one laser absorber;
    H) about 0.01% to about 60% by weight of the at least one further flame retardant other than melamine cyanurate and phosphorous-containing flame retardants; and
    K) about 0.01% to about 50% by weight of the at least one filer other than components B) and C);
    with the proviso that the sum total of all the percentages by weight of all the components is always 100.

4. The composition according to claim 3, wherein the composition further comprises L) at least one further additive other than components D) to K).

5. The composition according to claim 4, wherein the composition comprises about 0.01% to 20% by weight of component L), based on the overall composition, in which case amounts of the other components are reduced to such an extent that the sum total of all the percentages by weight is always 100.

6. The composition according to claim 5, wherein:
    the titanium dioxide has particles with a median particle size of 90 nm to 2000 nm with base structures of anatase or rutile form;
    the at least one of a lubricant and a demoulding agent comprises at least one of a long chain fatty acid, salts of long chain fatty acids, ester derivatives of long chain fatty acids, amide derivatives of long chain fatty acids, montan waxes, and low molecular weight polyethylene and polypropylene waxes;

the at least one further flame retardant is at least one of a halogen-free flame retardant and a phosphorus-free flame retardant;
the at least one further filler and/or reinforcer comprises at least one of talc, mica, silicate, amorphous wollastonite, kaolin, amorphous silicas, nanoscale minerals, magnesium carbonate, chalk, feldspar, barium sulphate, fibrous fillers based on carbon fibers, reinforcers based on carbon fibres, and untreated, surface-modified or sized reinforcers made from glass; and
the at least one further additive comprises at least one of antioxidants, UV stabilizers, gamma ray stabilizers, hydrolysis stabilizers, thermal stabilizers, antistats, emulsifiers, nucleating agents, plasticizers, processing auxiliaries, impact modifiers, dyes, pigments, and elastomer modifiers.

7. The composition according to claim 6, wherein:
the at least one of a lubricant and a demoulding agent is at least one of ethylenebisstearylamide, calcium stearate, and ethylene glycol dimontanate;
the at least one laser absorber is selected from the group of antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone;
the at least one further flame retardant is a nitrogen-containing flame retardant comprising at least one of reaction products of trichlorotriazine, piperazine and morpholine, condensation products of melamine, and ammonium salts; and
the at least one further filler and/or reinforcer is a mineral particulate filler based on talc, mica, silicate, wollastonite, kaolin, amorphous silicas, magnesium carbonate, chalk, feldspar and/or barium sulphate.

8. The composition according to claim 1, wherein the composition has a heat deflection temperature (HDT) of greater than 130° C. per DIN EN ISO 75-1, -2.

9. The composition according to claim 1, wherein:
the polyamide is at least one of nylon 6 and nylon 6,6;
the quartz powder has a d95 of 5 to 250 μm determined by laser diffractometry; and
the chopped long glass fibres have a starting length of 1 to 50 mm.

10. The composition according to claim 9, wherein:
the polyamide is semi-crystalline polyamide, and has a viscosity number determined in a 0.5% by weight solution in 96% by weight sulphuric acid at 25° C. to ISO 307 of 80 to 180 ml/g;
the ground quartz is a powder having a median particle size (d50) of about 2 μm to about 50 μm, a d95 of 10 to 150 μm, and a length to thickness ratio of less than 5;
the glass fibres have a diameter of 7 to 18 μm; and
the melamine cyanurate is in the form of particles having a median diameter of 0.1 μm to 100 μm.

11. The composition according to claim 10, wherein:
the particles of quartz powder are coated with 0.01% by weight to 1.5% by weight of at least one of a silane-based size and a siloxane-based size, based on the weight of the quartz powder;
the glass fibres are coated with 0.05% to 2% by weight of at least one of a silane-based size and a silane-based adhesion promotor;
the melamine cyanurate particles are coated with silicon-containing compounds.

12. The composition according to claim 11, wherein:
the silane-based size for the quartz powder is selected from the group consisting of aminopropyltrimethoxysilane, aminobutyltrimethoxysilane, aminopropyltriethoxysilane, aminobutyltriethoxysilane, aqueous hydrolysates thereof, and combinations thereof;
the silane-based adhesion promoters are silane compounds of the general formula (I)

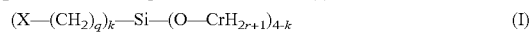

in which
X is $NH_2-$, carboxyl-, $HO-$ or

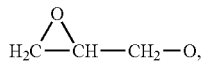

q is an integer from 2 to 10,
r is an integer from 1 to 5, and
k is an integer from 1 to 3; and
the silicon-containing compounds for coating the melamine cyanurate comprise organofunctionalized silanes or organosiloxanes.

13. The composition according to claim 12, wherein:
in the general formula (I):
a is 3 or 4,
r is 1 or 2, and
k is 1; and
the composition comprises:
A) about 30% to about 80% by weight of the polyamide;
B) about 10% to about 40% by weight of the quartz powder, wherein the particles of quartz powder have a d95 of about 16 to about 55 μm and a d50 of about 8 to about 25 μm;
C) about 4% to about 6% by weight of the chopped long glass fibres, wherein the fibres have a starting length of about 2 to about 7 mm,
D) about 1% to about 20% by weight of the melamine cyanurate, wherein particles of the melamine cyanurate have a particle size of 0.1 to 7 μm, and
at least one of:
E) about 5% to about 20% by weight of titanium dioxide;
F) about 0.01% to about 2% by weight of at least one of a lubricant and a demoulding agent;
G) about 0.5% to about 3.5% by weight of at least one laser absorber;
H) about 5% to about 25% by weight of at least one further flame retardant other than melamine cyanurate and phosphorous-containing flame retardants;
K) about 2% to about 6% by weight of at least one filler and or reinforce other than components B) and C); and
L) about 0.1 to about 5% by weight of at least one further additive other than components D) to K),
with the proviso that the sum total of all the percentages by weight of all the components is always 100.

14. A product comprising the composition according to claim 1.

15. A composition comprising:
A) about 5% to about 96.9% by weight of a polyamide;
B) about 1% to about 60% by weight of quartz powder, wherein the quartz powder is a powder of naturally occurring quartz crystals;
C) about 2% to about 8% by weight of chopped long glass fibers; and D) about 0.1% to about 40% by weight of melamine cyanurate;

wherein the composition does not contain ground glass and does not contain phosphorous-containing flame retardants.

16. The composition according to claim 15, wherein:
the polyamide is nylon 6 or nylon 6,6;
the quartz powder is a powder with particles having a d95 of about 5 to about 250 μm; and
the chopped long glass fibers having a starting length of about 1 to about 50 mm and a diameter of 7 to 18 μm.

17. The composition according to claim 16, wherein the composition comprises:
A) 30% to 80% by weight of the polyamide;
B) 10% to about 40% by weight of the quartz powder, wherein the quartz powder has a d95 of 16 to 55 μm;
C) 4% to about 6% by weight of the chopped long glass fibers, wherein the chopped long glass fibers have a starting length of 2 to 7 mm; and
D) about 0.1% to about 20% by weight of the melamine cyanurate.

* * * * *